(12) United States Patent
Murakami

(10) Patent No.: US 7,924,773 B2
(45) Date of Patent: Apr. 12, 2011

(54) COMMUNICATION TERMINAL

(75) Inventor: Tadashi Murakami, Osaka (JP)

(73) Assignee: Kyocera Corporation, Kyoto (JP)

( * ) Notice: Subject to any disclaimer, the term of this patent is extended or adjusted under 35 U.S.C. 154(b) by 226 days.

(21) Appl. No.: 11/238,124

(22) Filed: Sep. 28, 2005
(Under 37 CFR 1.47)

(65) Prior Publication Data

US 2007/0081650 A1 Apr. 12, 2007

(30) Foreign Application Priority Data

Sep. 30, 2004 (JP) ................................. 2004-288238

(51) Int. Cl.
*H04W 4/00* (2009.01)
(52) U.S. Cl. ........ 370/328; 370/329; 370/352; 455/230; 455/231; 455/450.1
(58) Field of Classification Search .................. 455/230, 455/231, 450.1; 370/328, 329, 352
See application file for complete search history.

(56) References Cited

U.S. PATENT DOCUMENTS

| 4,641,133 | A | 2/1987 | Ono | |
|---|---|---|---|---|
| 6,278,712 | B1 * | 8/2001 | Takihiro et al. | 370/400 |
| 6,337,905 | B1 * | 1/2002 | Mizuta et al. | 379/265.02 |
| 6,978,311 | B1 * | 12/2005 | Netzer et al. | 709/232 |
| 2002/0036991 | A1 * | 3/2002 | Inoue | 370/328 |
| 2004/0013115 | A1 * | 1/2004 | Su et al. | 370/392 |
| 2005/0229211 | A1 | 10/2005 | Iino | |

FOREIGN PATENT DOCUMENTS

| JP | 60182266 A | 9/1985 |
|---|---|---|
| JP | 04176252 A | 6/1992 |
| JP | 11069031 A | 3/1999 |
| JP | 2000201266 A | 7/2000 |
| JP | 2002-300649 | 10/2002 |
| WO | 03010958 A1 | 2/2003 |

OTHER PUBLICATIONS

Chinese language office action and its English language translation for corresponding Chinese application 200510106368.7 lists the references above.
Japanese language office action and its English language translation for corresponding Japanese application 20040288238 lists the references above.

* cited by examiner

*Primary Examiner* — Nghi H Ly
*Assistant Examiner* — Amancio Gonzalez
(74) *Attorney, Agent, or Firm* — DLA Piper LLP (US)

(57) ABSTRACT

A communication terminal has a communicating section which performs communication via a network, an instructing section which gives instructions to perform communication, a reserving section which reserves performance of first communication by setting a starting time and an ending time of the first communication received through the communicating section, a notifying section which notifies a user that a reservation exists when the communicating section tries to perform second communication other than the first communication during a time period between a time preceding the starting time by a predetermined time period and the ending time, and a controlling section which controls to perform the second communication when an instruction to perform the second communication is given by the instructing section after the notification by the notifying section.

7 Claims, 7 Drawing Sheets

COMMUNICATION TERMINAL

CROSS-REFERENCE TO RELATED APPLICATIONS

This application is based upon and claims the benefit of priority from the prior Japanese Patent Applications No. 2004-288238, filed on Sep. 30, 2004, the entire contents of which are incorporated herein by reference.

BACKGROUND OF THE INVENTION

1. Field of the Invention

The present invention relates to a communication terminal such as a portable telephone.

2. Description of the Related Art

Recently, in accordance with advance and multifunction of a radio communication terminal such as a portable telephone, a high-speed data communication can be performed in addition to a voice call. Such a communication terminal is used for downloading moving picture and voice information such as a television program having a large data size. A portable communication terminal has been proposed in which download is automatically executed at a starting time reserved by the user so that communication such as download can be executed on a date and time convenient for the user (see JP-A-2002-300649).

JP-A-2002-300649 is referred to as a related art.

In the case where communication is reserved via a network and download of information is automatically executed as in JP-A-2002-300649, however, there arises a problem that the reserved download is not executed although the user reserved the download, in a situation where, during a time period when the reserved communication is to be performed, the user forgets the reservation and the portable communication terminal is used for performing other data communication, or where, during a time period when the reserved communication is to be performed, the portable communication terminal is used for a voice call with another user.

When download by communication via a network, particularly in a case of reservation of video recording of a television program which is distributed only at a predetermined date and time fails to be executed during the reserved time period, it is often that such a failure is irrevocable. The degree of damage due to the failure is immeasurable.

When a call from another user is received in the middle of download of information via a network, there is a danger that the download is interrupted. In this case, there is a problem that data received until the middle are wasted, and nonetheless a fee is charged.

SUMMARY OF THE INVENTION

An object of the invention is to provide a communication terminal which can surely perform reserved communication via a network.

The invention provides a communication terminal, having: a communicating section which performs communication via a network; an instructing section which gives instructions to perform communication; a reserving section which reserves performance of first communication by setting a starting time and an ending time of the first communication received through the communicating section; a notifying section which notifies a user that a reservation exists when the communicating section tries to perform second communication during a time period between a time preceding the starting time by a predetermined time period and the ending time; and a controlling section which controls to perform the second communication when an instruction to perform the second communication is given by the instructing section after the notification by the notifying section.

The invention also provides a communication terminal, having: a communicating section which performs communication via a network; an instructing section which gives instructions to perform communication; a reserving section which reserves performance of first communication by setting a starting time and an ending time of the first communication received through the communicating section; a notifying section which notifies a user that a reservation exists when a time preceding the starting time by a predetermined time period arrives during execution of second communication; and a controlling section which controls to continue the second communication when an instruction to perform the second communication is given by the instructing section after the notification by the notifying section.

In the communication terminal, the first communication is data communication of packet switching type, and the second communication is data communication of packet switching type or voice communication of circuit switching type.

In the communication terminal, the predetermined time period is variable in accordance with a communication program for executing the second communication.

The invention also provides a communication terminal, having: a communicating section which performs communication via a network; a reserving section which reserves performance of first communication by setting a starting time and an ending time of the first communication received through the communicating section; a notifying section which notifies a user that a reservation exists when the communicating section tries to perform second communication during a time period between a time preceding the starting time by a predetermined time period and the ending time; and a controlling section which controls not to perform the second communication when the communicating section tries to perform second communication during a time period between a time preceding the starting time by the predetermined time period and the ending time.

The invention also provides a communication terminal, having: a communication section which enables to connect with a network; an instructing section which gives instructions to perform communications; a reserving section which reserves performance of first communication; a notifying section which notifies a user; a controlling section which controls the notifying section to notify that a reservation exists when the instructing section gives an instruction to perform second communication during a time period between a time preceding a starting time of the first communication by a predetermined time period and the starting time, and then controls to perform the second communication.

The invention also provides a communication terminal, having: a communication section which enables to connect with a network; an instructing section which gives instructions to perform communications; a reserving section which reserves performance of first communication; a notifying section which notifies a user; a controlling section which controls the notifying section to notify that a reservation exists when the instructing section gives an instruction to perform second communication during a time period between a time preceding a starting time of the first communication by a predetermined time period and the starting time, and then controls not to perform the second communication.

The invention also provides a communication terminal, having: a communication section which enables to connect with a network; an instructing section which gives instructions to perform communications; a reserving section which reserves performance of first communication; a notifying section which notifies a user; a controlling section which controls the notifying section to notify that a reservation exists when a time preceding a starting time of the first communication by a predetermined time period arrives during execution of second communication, and then controls to continue the second communication.

According to the communication terminal, the reserved communication via a network can be surely performed.

DETAILED DESCRIPTION OF THE PREFERRED EMBODIMENTS

Embodiments of the invention will be specifically described with reference to the accompanying drawings.

FIGS. 1 to 7 are views referenced in description of a portable telephone 5 of an embodiment of the invention.

Figure 1:
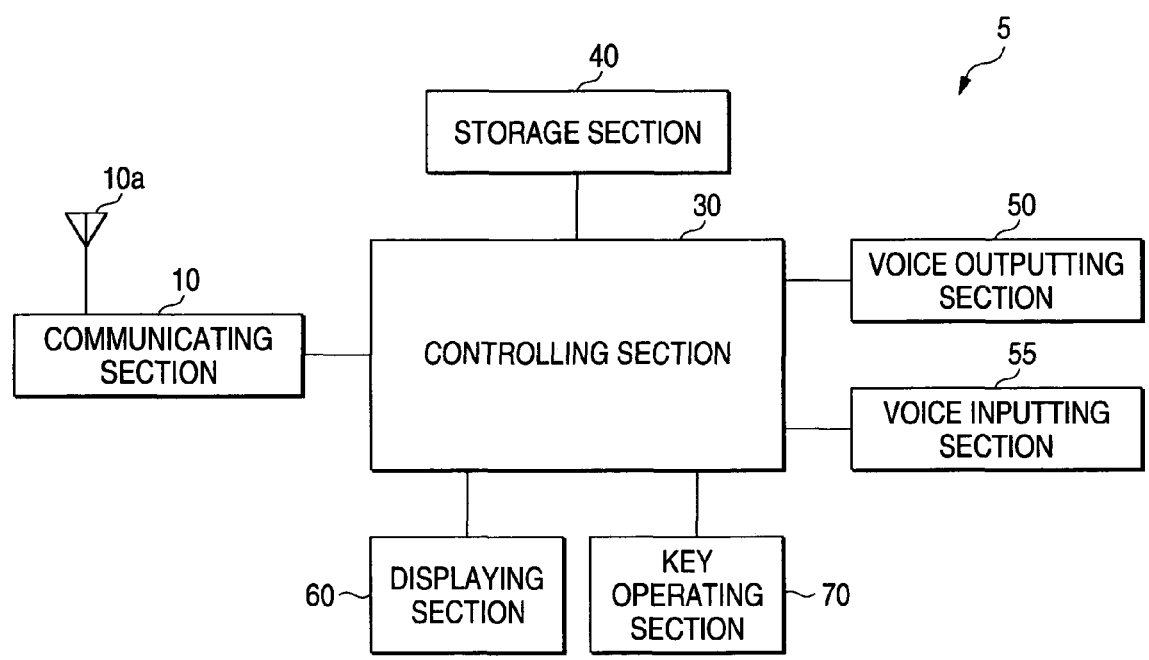
FIG. 1 is a block diagram showing the circuit configuration of a portable telephone of an embodiment of the invention.

FIG. 1 is a block diagram showing the circuit configuration of the portable telephone 5. The portable telephone 5 has a key operating section 70 including a plurality of operation keys, a storage section 40 such as a RAM (Random Access Memory,; a displaying section 60 such as an LCD (Liquid Crystal Display), a voice outputting section 50 which outputs a sound and a voice, a communicating section 10 which includes an antenna 10a, and performs radio processing such as demodulation and modulation, a voice inputting section 55 which converts a voice into an electric signal and inputs the signal, and a controlling section 30 which controls the components.

In the embodiment, the controlling section 30 functions also as a reserving section.

The portable telephone 5 of the embodiment can perform voice communication of circuit switching type used in a usual call, and also perform data communication of packet switching type with using the common antenna 10a. In the portable telephone 5, data communication can be reserved through the reserving section, and particularly download of communication data can be reserved.

On the basis of a date and time which is input by the user who operates the key operating section 70, the controlling section 30 reserves communication such as download of data from a specific server, or recording of a television broadcasting program. The controlling section 30 stores reservation information such as the starting and ending times of the reserved communication, into the storage section 40. The controlling section 30 actuates the communicating section 10 on the starting time of the reserved communication to start the reserved communication, and stops the communicating section 10 on the ending time to end the reserved communication.

The controlling section 30 sets to restrict the start of another communication other than the reserved communication, on the time preceding the reserved starting time (for example, 13:00) by a predetermined time period (for example, 30 minutes). The predetermined time period may be a unique time period, or alternatively may be variable in accordance with a communication program which executes the communication other than the reserved communication. In the case where even one communication seems to occupy the antenna 10a for a relatively long time period, such as a voice call, the predetermined time period is preferably set to be longer.

On the time preceding the starting time of the reserved download by the predetermined time period, the controlling section 30 conducts a control operation such as prohibition of subsequent other data or voice communication, or interruption of data or voice communication which is currently performed.

The operation procedure of the portable telephone 5 will be described.

It is assumed that the portable telephone 5 is reserved so that download is executed on a specific date and time (a starting time of the reserved communication, 13:00) which is set by an operation of the user, and the predetermined time period for restricting communication other than the reserved download is set to 30 minutes.

Figure 2:
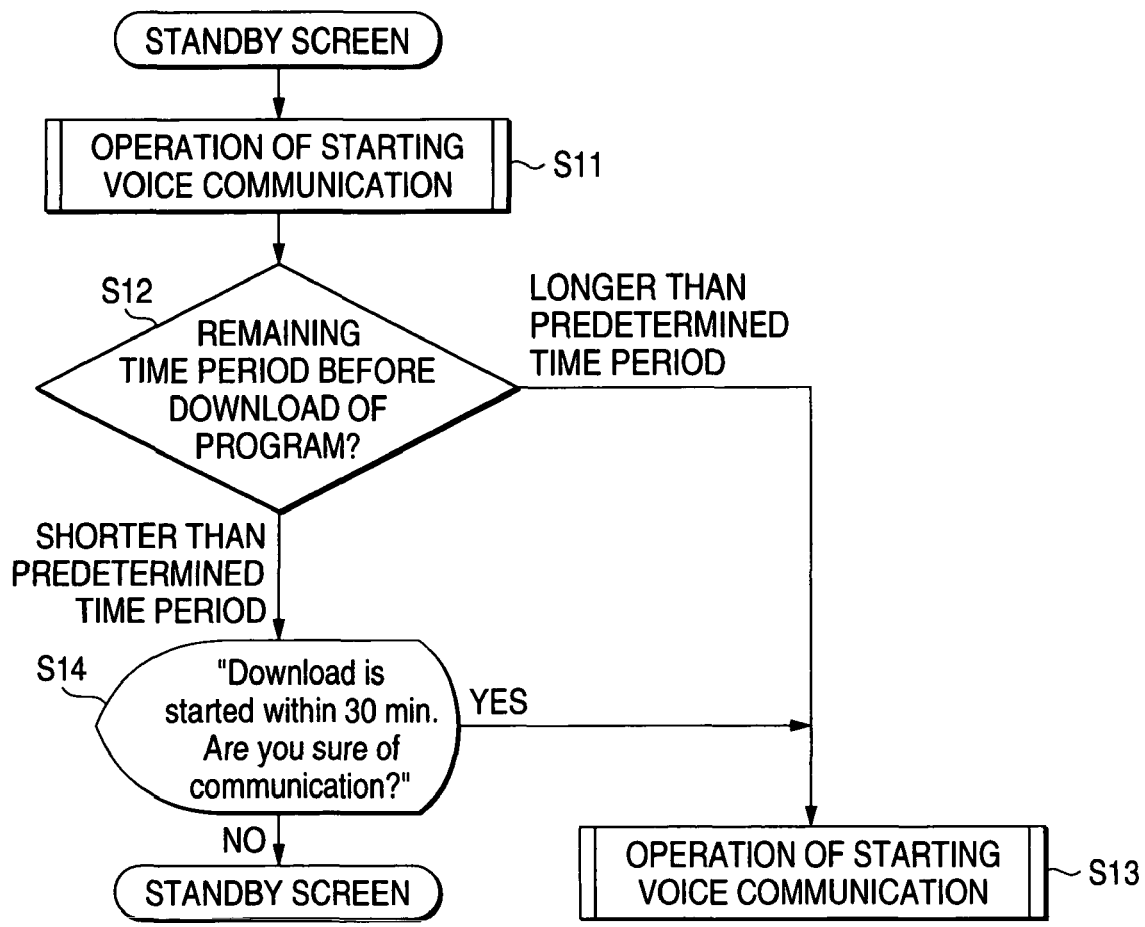
FIG. 2 is a flowchart showing an operation procedure of a portable telephone of a first example.

The operation procedure of the portable telephone 5 of a first example will be described with reference to the flowchart of FIG. 2.

When the portable telephone 5 is in the standby status where the displaying section 60 displays a standby screen, the user performs an operation of starting voice communication with another user (step S11). Then, the controlling section 30 determines the time period remaining before the start of download of program data (step S12). If the remaining time period is longer than the predetermined time period of 30 minutes, the execution of the operation of voice communication is not restricted (step S13).

Figure 5:
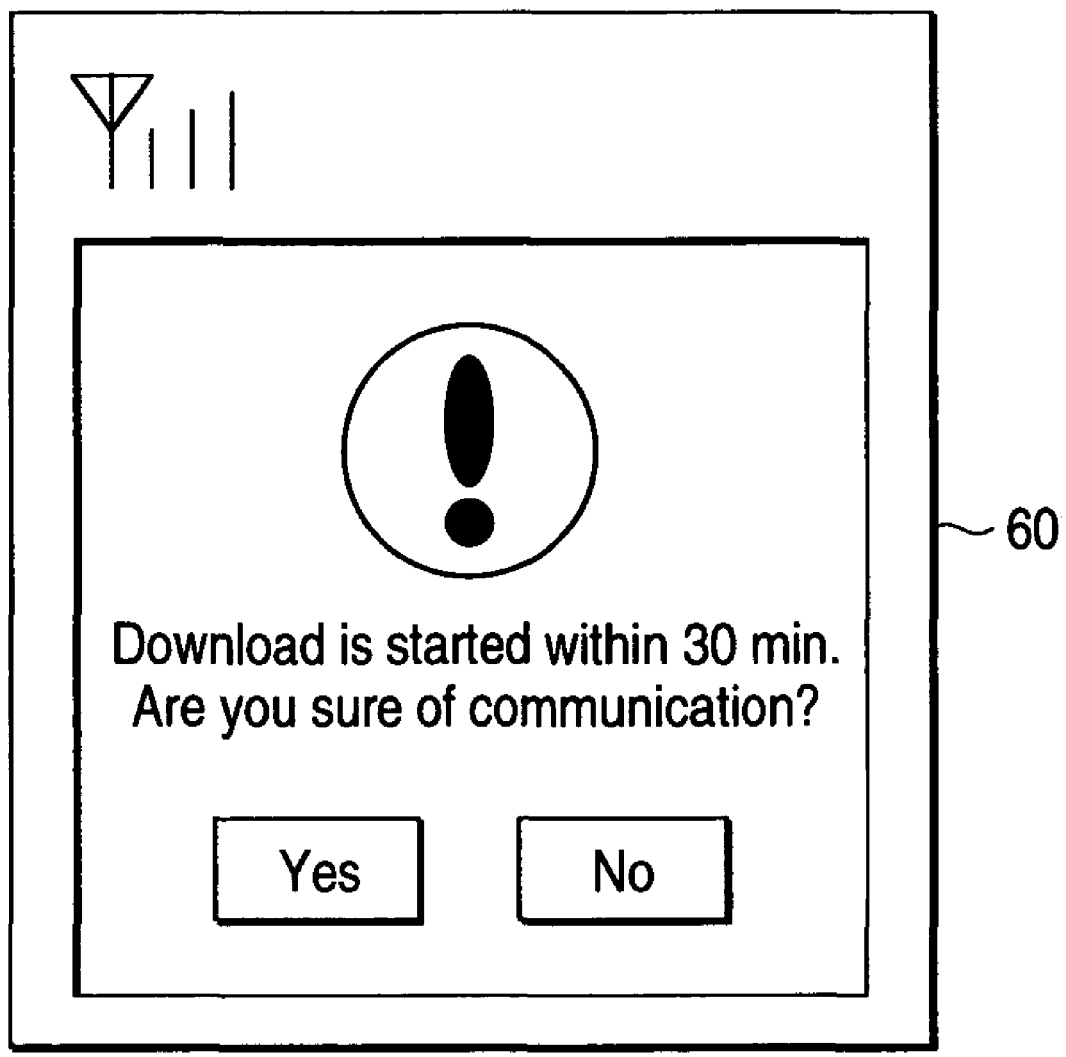
FIG. 5 is a view showing a first display example of a displaying section.

If the remaining time period is determined in step S12 to be shorter than the predetermined time period of 30 minutes, a notification message of, for example, "Download is started within 30 min. Are you sure of communication?" is displayed on the displaying section 60 as shown in FIG. 5 (step S14). When the message reminds the user that download is reserved, and the user judges that the voice communication is not a matter of importance, the user cancels the operation of the voice communication(NO in step S14), so that the download based on the reservation can be prioritized.

If the user judges in step S14 that the voice communication (call) is more important (urgent) than the download (YES in step S14), a starting process of the voice communication is selected, and the starting process is continued (step S13). In this case, when the user sees the notification message displayed on the displaying section 60, the user can know the time period when the call should be ended.

Figure 3:
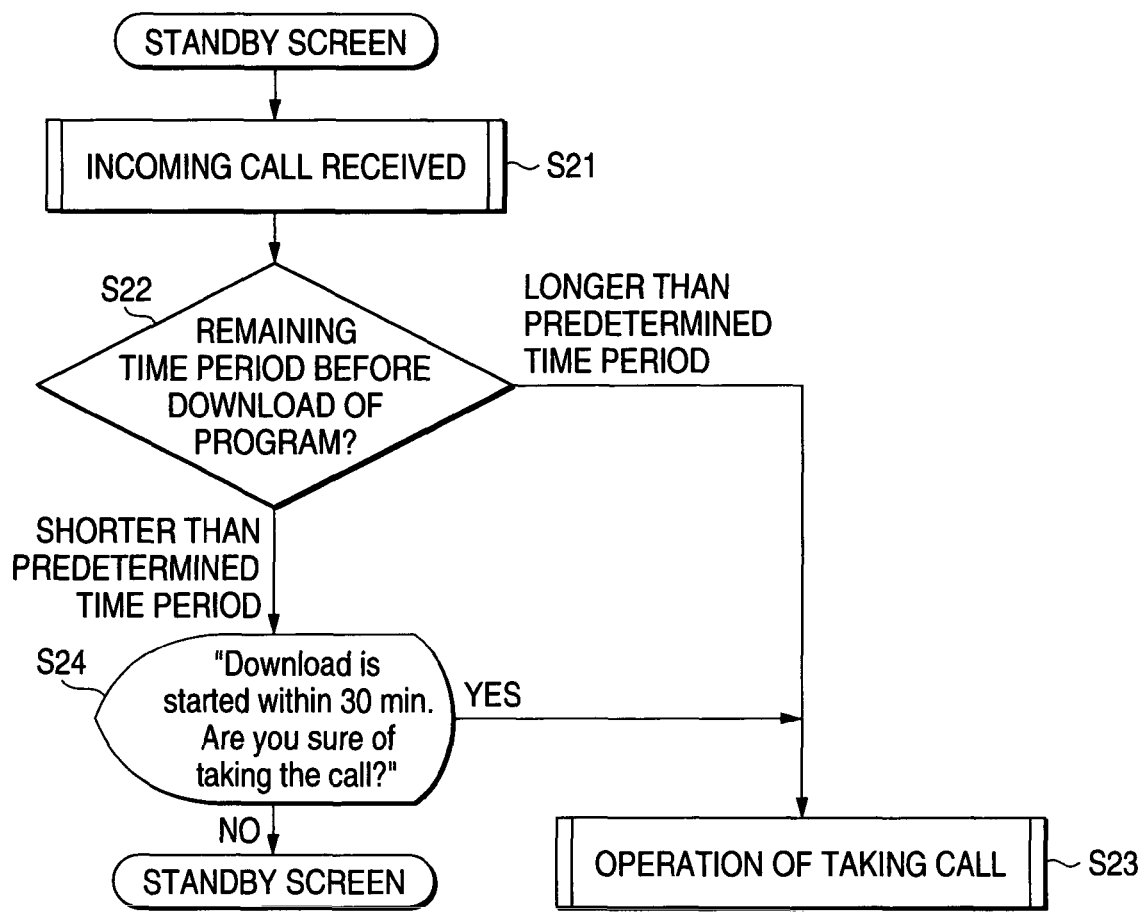
FIG. 3 is a flowchart showing an operation procedure of a portable telephone of a second example.

Next, the operation procedure of the portable telephone 5 of a second example will be described with reference to the flowchart of FIG. 3. In the second example, when the portable telephone 5 is in the standby status where the displaying section 60 displays a standby screen, and the portable telephone 5 receives an incoming call (step S21), the controlling section 30 determines the time period remaining before the start of download of program data (step S22). If the remaining time period is longer than the predetermined time period of 30 minutes, the operation of taking the call is not restricted (step S23).

Figure 6:
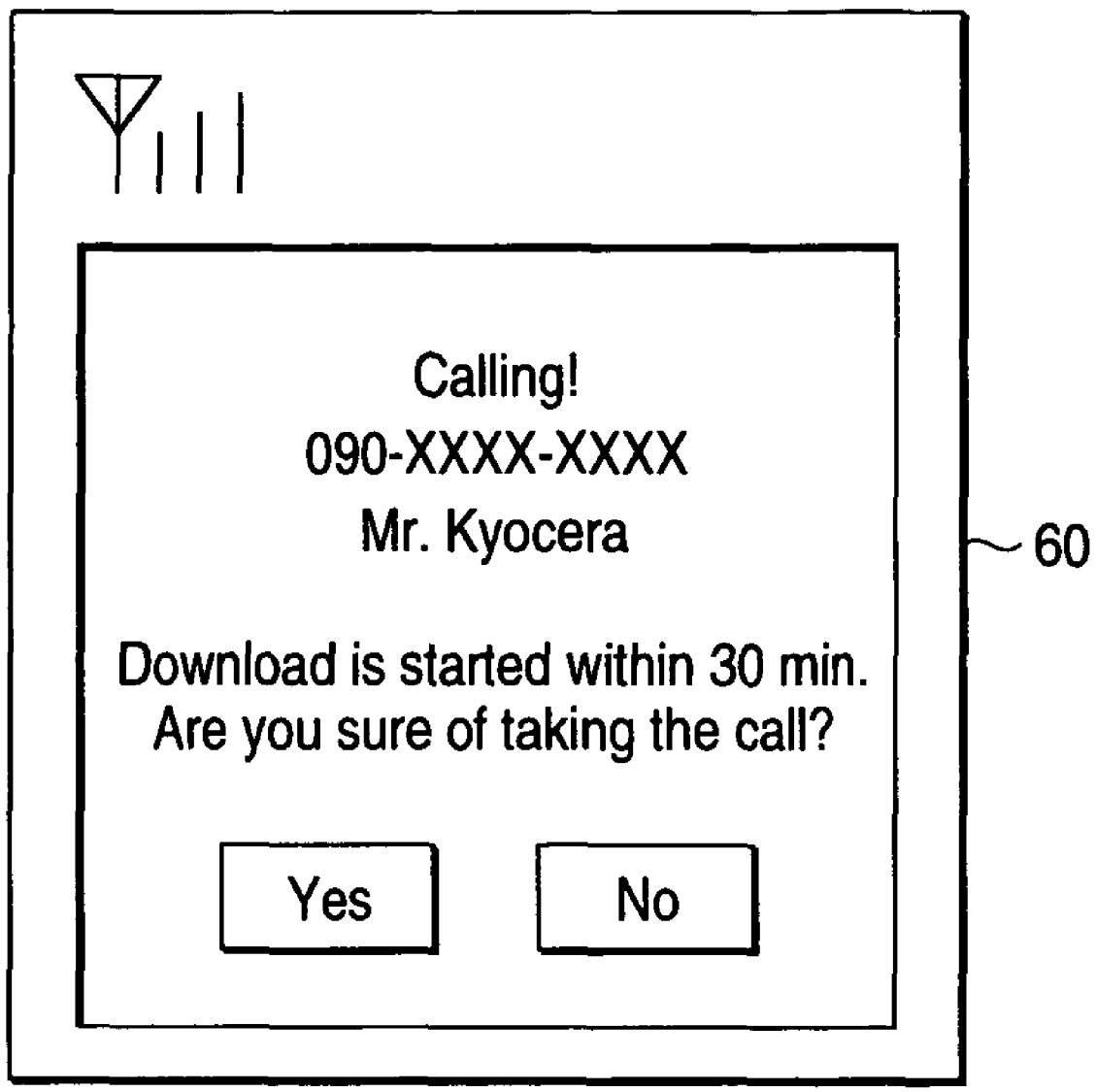
FIG. 6 is a view showing a second display example of the displaying section.

If the remaining time period is shorter than the predetermined time period of 30 minutes, a notification message of, for example, "Download is started within 30 min. Are you sure of taking the call?" is displayed together with the telephone number of the calling person and the name of the calling person stored in the storage section 40, on the displaying section 60 as shown in FIG. 6 (step S24). When the message reminds the user that download is reserved, and the call is not seemed to be emergent in view of the calling person and the remaining time period, the call is not answered (NO in step S14), and the download based on the reservation can be prioritized.

If the user judges in step S24 that it is important (urgent) to take the call than the download (YES in step S24), a process of taking the call is selected, and the process is continued (step S23). In this case, when the user sees the notification message displayed on the displaying section 60, the user can know the time period when the call should be ended.

Figure 4:
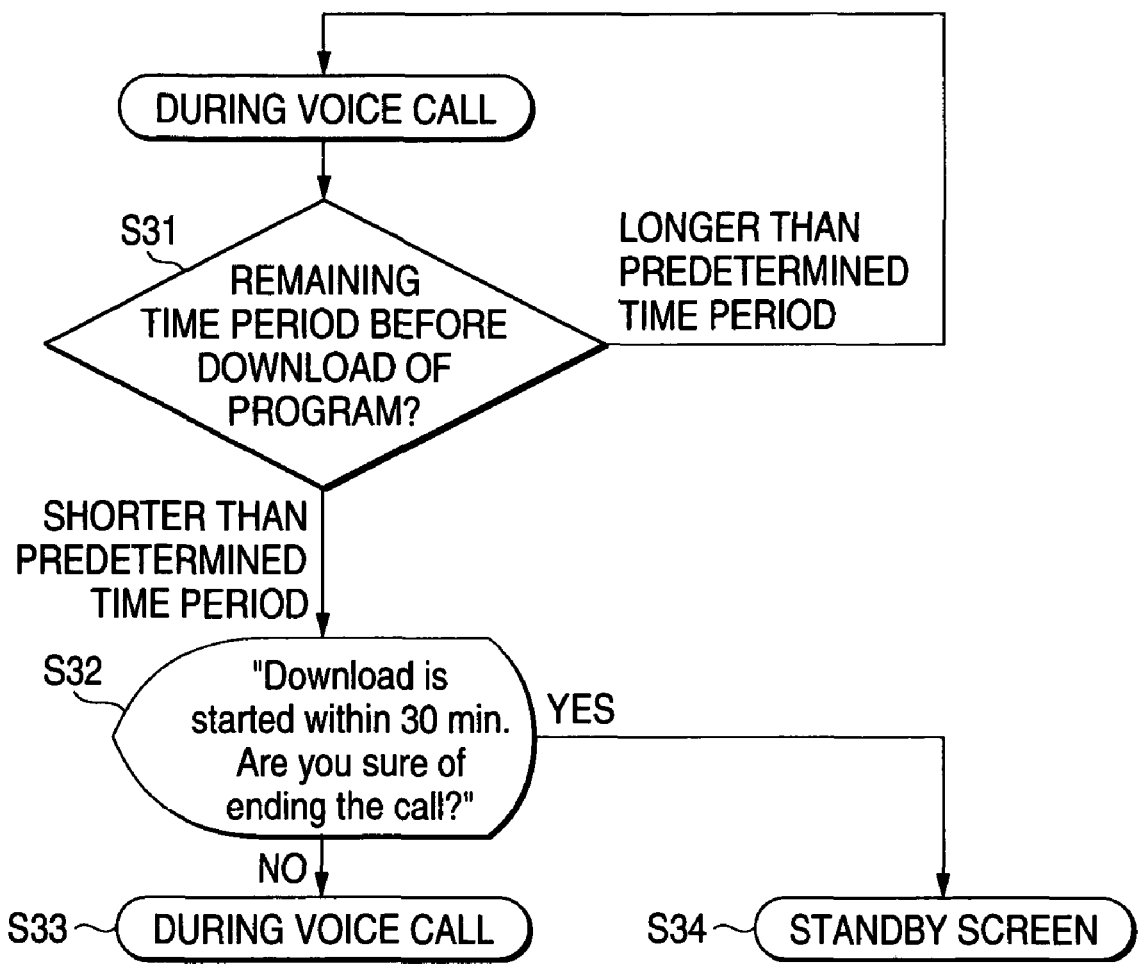
FIG. 4 is a flowchart showing an operation procedure of a portable telephone of a third example.

Next, the operation procedure of the portable telephone 5 of a third example will be described with reference to the flowchart of FIG. 4. When the portable telephone 5 is conducting a voice call and the displaying section 60 displays "During voice call," the controlling section 30 determines the time period remaining before the start of download (step S31). If the remaining time period is shorter than the predetermined time period of 30 minutes, an alarm sound is generated from the voice outputting section 50, and a notification message of, for example, "Download is started within 30 min. Are you sure of ending the call?" is displayed on the displaying section 60 as shown in FIG. 7 (step S32).

The alarm sound and the notification message displayed on the displaying section 60 remind the user that download is reserved. When the call is not seemed to be important in view of the calling person and the remaining time period, the call is interrupted (YES in step S32), and the download based on the reservation can be prioritized (step S34).

If the user judges in step S32 that the continuance of the call is more important than the download (NO in step S32), the call is continued (step S33). In this case, when the user sees the notification message displayed on the displaying section 60, the user can know the time period when the call should be ended. Therefore, the user can adjust the time period of continuing the call.

Figure 7:
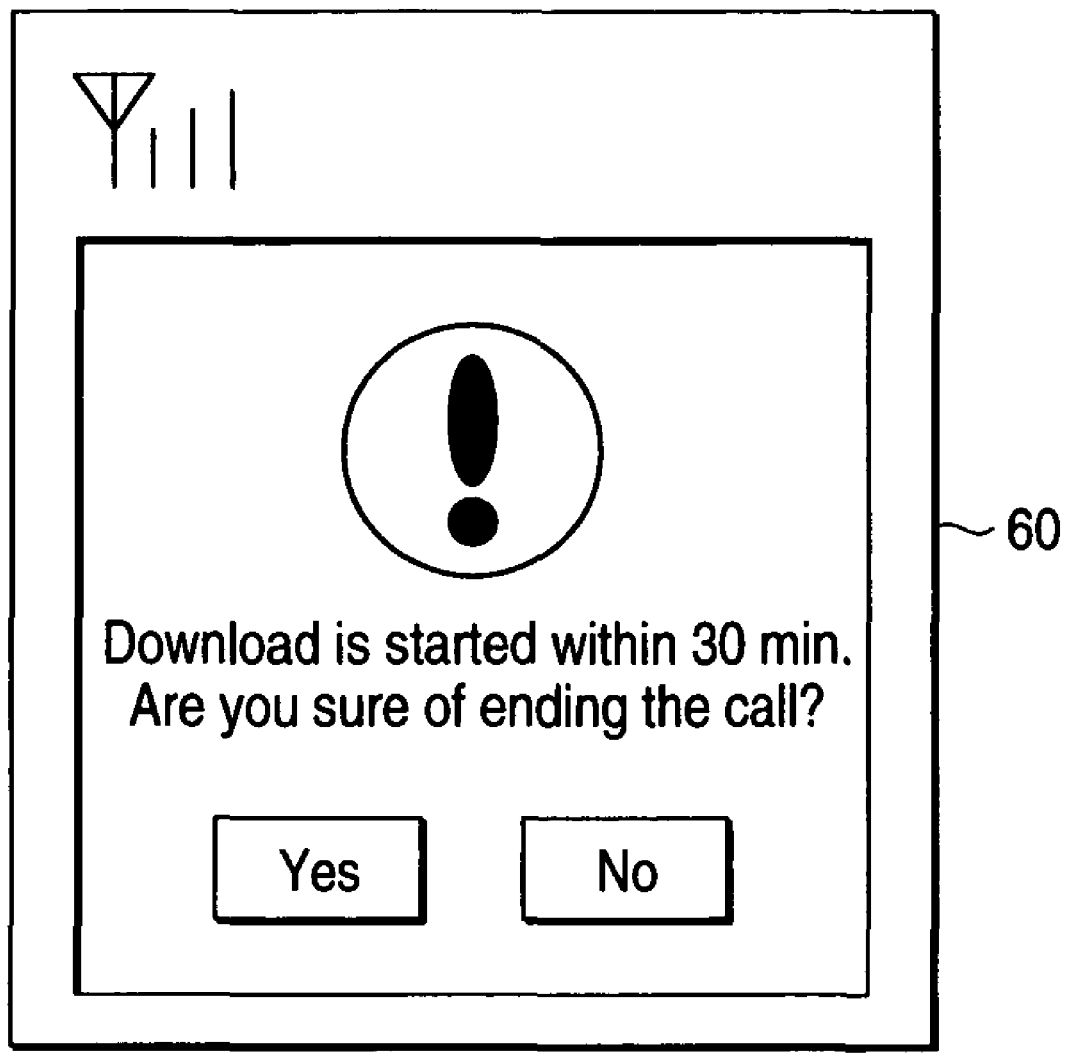
FIG. 7 is a view showing a third display example of the displaying section.

If the remaining time period is judged in step S31 to be longer than the predetermined time period of 30 minutes, the notification message such as shown in FIG. 7 is not displayed on the displaying section 60. Therefore, the user can concentrate on the call without paying attention to the remaining time.

According to the first to third examples of the embodiment, even when the user forgets the reserved time of download and tries to perform other communication at the time closed to the reserved time, a warning can be given against the communication. Therefore, the user can be reminded of the reservation of download, and a failure of communication of the reserved download can be prevented from occurring.

Even when the user forgets the starting time of the reserved communication and performs other communication at the time closed to the starting time of the reserved communication, the controlling section 30 can warn the user to end the other communication. Therefore, the user can be reminded of the reservation of download, and a failure of communication of the reserved download can be prevented from occurring.

According to the embodiment, therefore, the reserved communication can be surely performed.

The first to third examples in which the second communication is voice communication have been described. However, the invention is not restricted to them. For example, the second communication may be data communication such as communication in which data are downloaded from an arbitrary URL, or that in which data are uploaded to an arbitrary URL.

The predetermined time period which is set in advance to the starting time of the reserved download is variable in accordance with a communication program which executes communication for a use other than the reserved download. In the case where one communication seems to occupy the communicating section for a relatively long time period, such as a voice call, therefore, the predetermined time period is set to be longer, whereby the user can be early reminded that download is reserved.

In the first to third examples described above, after the notification message is displayed, the user selects as a general rule not to perform the second communication. The invention is not restricted to this. In summary, the second communication is not performed unless the user instructs to perform the second communication. Namely, when, after the notification message is displayed, the user does not instruct to perform the second communication, the call may be automatically interrupted without performing the second communication.

Although the portable telephone 5 has been described in the embodiment, the invention is not restricted to a portable telephone. It is a matter of course that the invention can be applied also to other communication terminal apparatuses such as a PDA (Personal Digital Assistant) as far as the apparatuses can attain an effect similar to that of the invention.

What is claimed is:

1. A communication terminal, comprising:
  a communicating section which performs communication via a network;
  an instructing section which gives instructions to perform communication;
  a reserving section which reserves performance of first communication by setting a starting time and an ending time of the first communication received through the communicating section;
  a controlling section which, during execution of second communication, determines if a remaining time period before the starting time of the reserved first communication is shorter than a predetermined time period;
  a notifying section which notifies a user, during execution of second communication, that the reservation exists when the controlling section determines that the remaining time period before the starting time is shorter than the predetermined time period; and
  wherein the controlling section controls to continue the second communication when the instruction section gives an instruction to perform the second communication, after the notification by the notifying section.

2. The communication terminal according to claim 1, wherein the first communication is data communication of packet switching type, and the second communication is data communication of packet switching type or voice communication of circuit switching type.

3. The communication terminal according to claim 1, wherein the predetermined time period is variable in accordance with a communication program for executing the second communication.

4. A communication terminal, comprising:
a communication section which enables to connect with a network;
an instructing section which gives instructions to perform communications;
a reserving section which reserves performance of first communication having a starting time;
a notifying section which notifies a user;
a controlling section which, during execution of second communication, determines a remaining time period before the starting time of the reserved first communication, and determines if the remaining time before the starting time is shorter than a predetermined time period, and which controls the notifying section to notify that the reservation exists when it is determined that the remaining time period is shorter than the predetermined time period, and then controls the communication section to continue the second communication.

5. The communication terminal according to claim 4, wherein the first communication is data communication of packet switching type, and the second communication is data communication of packet switching type or voice communication of circuit switching type.

6. The communication terminal according to claim 1,
wherein the notifying section includes a displaying section, and
wherein when the controlling section determines that the remaining time period becomes shorter than the predetermined time period, the displaying section displays a screen indicating that the reservation exists.

7. The communication terminal according to claim 4,
wherein the notifying section includes a displaying section, and
wherein when it is determined that the remaining time period becomes shorter than the predetermined time period, the controlling section controls the displaying section to display a screen indicating that the reservation exists.

* * * * *